Oct. 28, 1952            J. V. JOLLY            2,615,928
ELIMINATION OF CONDENSER AND ACCUMULATOR
IN A HYDROCARBON CONVERSION PROCESS
Filed Sept. 23, 1948
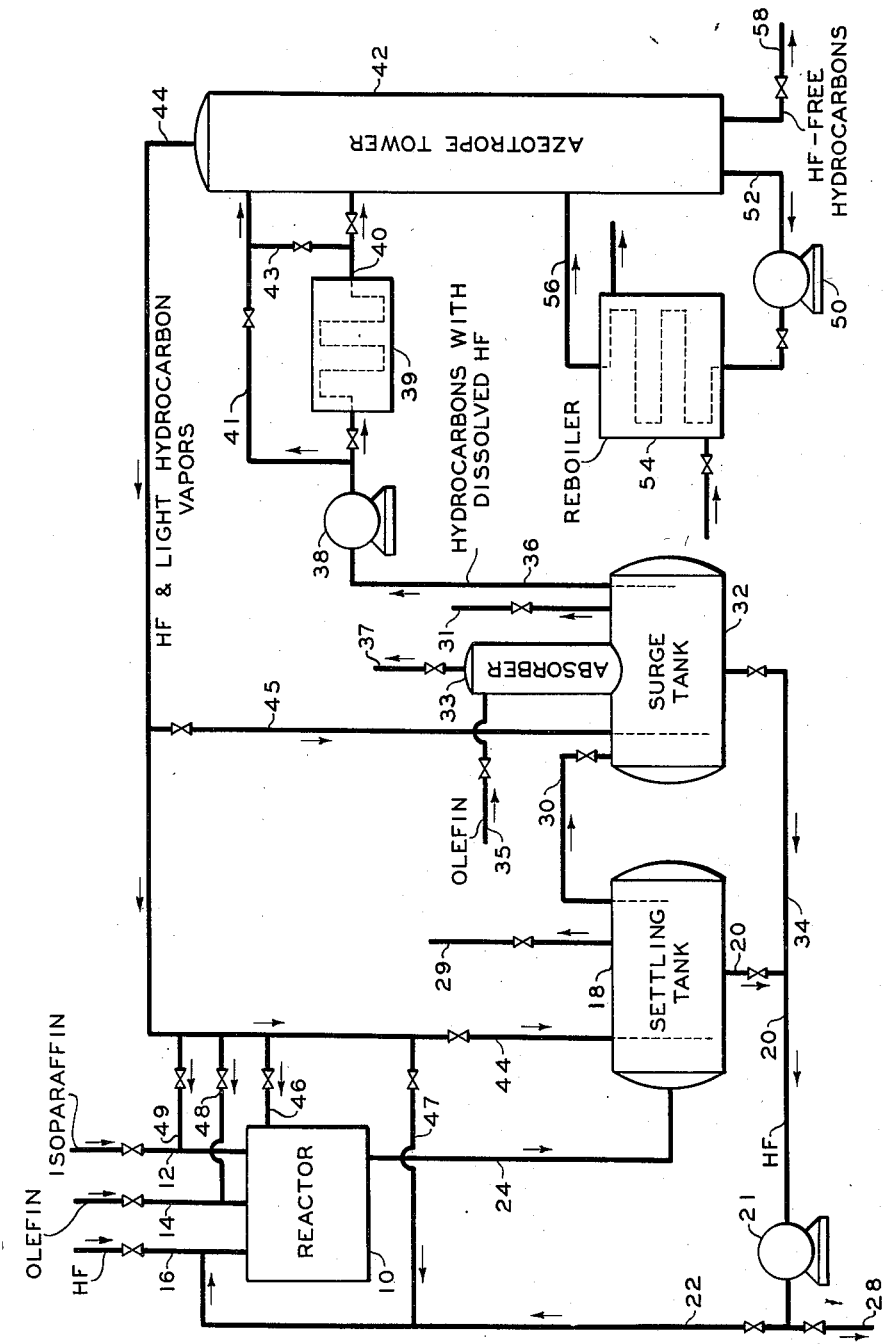
INVENTOR.
J. V. JOLLY
BY Hudson & Young
ATTORNEYS Patented Oct. 28, 1952

2,615,928

UNITED STATES PATENT OFFICE 2,615,928

ELIMINATION OF CONDENSER AND ACCUMULATOR IN A HYDROCARBON CONVERSION PROCESS

John V. Jolly, Phillips, Tex., assignor to Phillips Petroleum Company, a corporation of Delaware Application September 23, 1948, Serial No. 50,776

9 Claims. (Cl. 260—683.4)

This invention relates to the distillation of mixtures of hydrogen fluoride and hydrocarbons. In a specific embodiment the invention relates to the recovery of hydrogen fluoride from admixture with hydrocarbon material containing low-boiling paraffin hydrocarbons. The invention in a specific modification relates to the operation of an azeotropic fractionation wherein a low-boiling paraffin-hydrogen fluoride azeotrope is recovered overhead with the production of a hydrogen fluoride-free bottom product. This application is a continuation-in-part of my copending application Serial No. 667,813, filed May 7, 1946, now abandoned.

Hydrogen fluoride has recently come into prominence as a very important catalyst for numerous organic reactions. For example, it is used as a catalyst in the conversion of hydrocarbons by alkylation, isomerization, reconstruction, cracking, cyclization and/or aromatization. It is also used as a reactant in the production of alkyl fluorides. Liquid hydrogen fluoride has also been found useful as a refining agent or selective solvent in the removal of certain impurities from saturated hydrocarbons. In such reactions hydrogen fluoride is used alone, or is promoted with a small amount of boron trifluoride, such as 0.1 to 5 per cent by weight of the total catalyst.

Perhaps the most important industrial process at the present time involving the use of hydrogen fluoride is the alkylation of low-boiling paraffinic hydrocarbons, particularly isobutane, with alkylating agents, particularly low-boiling olefins such as ethylene, propylene, butylenes and amylenes, to form normally liquid high-octane-number paraffins suitable for use in motor and aviation fuels. In such alkylation processes the reactants are intimately contacted, generally in the liquid phase, with concentrated hydrofluoric acid, and reaction effluents are passed to a settling zone wherein a liquid hydrocarbon-rich phase and a liquid acid-rich phase are separated. Most of the acid phase is recycled to the reaction and a portion thereof may be subjected to purification, as by distillation for the removal of water and acid-soluble oils, before being reintroduced as a catalyst into the process. The hydrocarbon phase is ordinarily introduced into a fractionating tower provided with kettle heating and reflux cooling, from which tower an overhead fraction is recovered comprising all the hydrogen fluoride together with at least sufficient low-boiling hydrocarbons to form azeotropes therewith. Inasmuch as a large excess of the low-boiling paraffin reactant, such as isobutane, is maintained in the alkylation reaction mixture, and some propane is usually also present, there is an adequate amount of low-boiling paraffin hydrocarbons in the feed to the azeotrope tower to allow complete separation of hydrogen fluoride overhead. The overhead product is subjected to separate cooling and condensation and the resulting condensate is passed to a settling zone or accumulator for separation of acid phase and hydrocarbon phase. The acid phase is returned to the reaction, while the hydrocarbon phase is pumped to the top of the azeotrope tower to provide liquid reflux. A large volume of light hydrocarbons must thus be continually condensed by a condenser inserted in the overhead line from the fractionator. The accumulator and pump required for this operation are of course subject to corrosion by the acid.

It is an object of this invention to provide an improved process for the distillation of hydrogen fluoride-containing mixtures.

Another object is to recover hydrogen fluoride from admixture with hydrocarbons.

A further object is to improve the operation of a fractionation system in which a minimum-boiling azeotropic mixture of hydrogen fluoride with low-boiling paraffinic hydrocarbon material is produced in an overhead product.

Another object is to reduce the amount of cooling required in such a system.

Another object is to reduce the pressure in such a system.

A further object is to reduce the equipment needed for such a system.

A yet further object is to provide such a system in which the amount of equipment in contact with acid is reduced.

Another object is to increase the capacity of a fractionator.

Still another object is to recover a hydrocarbon fraction substantially free of hydrogen fluoride from a mixture containing low-boiling hydrocarbons and hydrogen fluoride.

A further object is to provide an improved method for recovering hydrogen fluoride catalyst for re-use in a reaction zone, and to recover hydrocarbon material free from hydrogen fluoride, in a process for the conversion of hydrocarbons, particularly in an alkylation process.

Other objects and advantages of the invention will be apparent, to one skilled in the art, from the accompanying disclosure and description.

I have now discovered an improved manner of carrying out fractionations of the nature described. By employing the principles of my invention the complete recovery of hydrogen fluoride, and any accompanying promoter, such as boron trifluoride, from the overhead fraction is possible without the necessity of providing the conventional condenser and accumulator, while still producing the desired HF-free bottom product. In this improved manner of operating the azeotropic distillation, the cooling ordinarily provided in the top of the azeotrope tower may be entirely dispensed with. Nor is it necessary to provide an arrangement for separate condensation and recovery of overhead product. In addition to the savings in equipment, which is an important item at the present time, the amount of equipment in contact with acid, and hence subject to corrosion, is reduced. A given fractionator is also enabled to handle a larger load, that is, produce more bottom product of a given purity.

The improved operation is obtained in a very simple manner by introducing the liquid hydrocarbon phase, from which acid has been settled but which still contains dissolved hydrofluoric acid, as feed to the fractionator, preferably at the top of the fractionator rather than at an intermediate point as is conventional, and removing overhead vapors and returning the same to a point in the system ahead of the fractionator. In one embodiment of my invention, this overhead vaporous mixture is preferably passed directly to the acid settler, without condensation thereof. In another embodiment of my invention, this uncondensed vaporous mixture is returned directly to the reaction zone and admixed with liquid in, or passing to, the reaction zone. The liquid feed to the fractionator is normally obtainable at substantially atmospheric temperatures, i. e. 75 to 115° F., and since the fractionator is readily and usually operated at elevated temperatures, the feed itself provides all the cooling that is necessary within the fractionator. Even when the feed is at somewhat elevated temperatures, the fractionator is easily operated at sufficiently higher temperature that the feed acts as reflux. In some cases, in fact, the feed is heated somewhat before introduction into the fractionator. It will accordingly be seen that the liquid feed containing dissolved hydrogen fluoride as well as low-boiling unreacted hydrocarbons and higher-boiling alkylate acts as refluxing medium for the azeotrope tower. Essentially, therefore, the azeotrope tower operates as a stripping column. The overhead vapors carrying the hydrogen fluoride are returned directly to some liquid in the system ahead of the fractionator, such as the acid settler or the reaction zone.

When the overhead vapors are passed into the liquid, either in the acid settler or in the reaction zone, the vapors are condensed by the cooling effect of the liquid. Since the overhead vapors in liquid volume per unit of time, is generally no more than about one tenth the volume of the liquid stream passing from the settler to the azeotrope fractionator, and is not much warmer than the liquid with which it is admixed, the increase in temperature of the liquid to which the vapor is added is very small and has no adverse effect upon the operation of the system. When the uncondensed vapor is introduced into the reaction zone, any tendency toward a temperature rise is quickly offset by removal of heat by the cooling means which is usually present.

Such an operation as this is impossible in ordinary fractional distillations because of contamination of overhead product with part of the material normally removed as bottom product. The previous methods of carrying out this azeotropic distillation avoided such carryover, but such a pure product is not required when passing same to the primary settler and hence represents a needless burdening of the fractionation system. In effect, the process of the present invention establishes an internal circuit through which a certain amount of light hydrocarbons and smaller amounts of heavier hydrocarbons continuously circulate, this circuit comprising the settler, top of the "azeo" tower, and back to the settler, and also comprising the reaction zone when the vaporous mixture is introduced into the reaction zone. Hydrofluoric acid dissolved in the hydrocarbon phase passes once through this circuit and upon returning to the settler in the overhead condensate does not redissolve in the hydrocarbon phase, which is already saturated with HF, but settles out and is recovered with the acid phase. The total hydrocarbon portion of the reactor effluent, except that small part which is dissolved in the acid phase, passes into the fractionator and out as kettle product. The net effect is that the hydrocarbon phase from the acid settler is stripped only of dissolved hydrogen fluoride. By the practice of my invention not only are considerable equipment and cooling costs avoided but an extremely smooth operation of the fractionator is obtained. This is due in part to the fact that only one stream need be controlled as it enters the fractionator, as well as to the elimination of the condensation of the overhead by the conventional condenser. By operating the fractionator as a stripper without a condenser in accordance with the invention, the capacity of the fractionator is increased, and it may be operated at a lower pressure, or at higher temperatures, which in any case allows greater throughput.

Although it is preferable to introduce the feed into the azeotrope tower at the top thereof to eliminate the rectifying section of the tower, a portion of the feed may be introduced into an intermediate point of the tower and another portion of the feed introduced above the intermediate feed point as a liquid reflux, if desired. Furthermore, cooling coils or like external cooling means may be positioned in the upper portion of the tower or column to aid in cooling fluid in the upper portion of the column without departing from the scope of this invention. When external cooling of the upper portion of the column is practiced, all of the feed may be introduced at an intermediate point in the column, which method of operation results in the formation of a rectifying section in the upper portion of the column and a stripping section in the lower portion of the column.

In any of the above described methods for operation of the azeotrope tower, the overhead vapors from the tower are at a temperature approximately the same as the temperature of the liquid feed to the tower. These overhead vapors are passed directly into the liquid which eventually comprises the feed to the column, preferably directly into either the acid settler, which, because of the equally large volumes of both liquid acid and liquid hydrocarbons at a temperature usually below about 125° F., condenses all the condensible gases of the overhead fraction, or into the reaction zone which is usually supplied with cooling means to remove heat of exothermic reaction, and also is at a temperature of 75 to 115–125° F. The uncondensible gases from the overhead fraction of the effluent itself are vented from the acid settler in the conventional manner.

The invention may perhaps be more adequately understood by reference to the accompanying drawing and description thereof. The drawing represents somewhat diagrammatically one preferred arrangement of apparatus elements, and flow of materials therethrough, in which the process of the invention may be practiced. While the elements essential to an understanding of the invention are shown in the drawing, it will be appreciated that various auxiliary pieces of equipment may be provided by one skilled in the art. It will also be appreciated that various modifications and omissions may be made without departing from the spirit and scope of the invention.

In the drawing a reaction zone is represented diagrammatically by the rectangle 10. In a preferred operation this reactor is used in carrying out the alkylation of a low-boiling paraffin, preferably isobutane, with one or more low-boiling olefins, such as a mixture of butenes. The isoparaffin may be introduced by line 12 while the olefin is introduced by line 14. Make-up liquid hydrogen fluoride catalyst is introduced through line 16. The bulk of the catalyst is recycled to the reactor from the bottom of settling tank 18 via lines 20 and 22. In some cases it is desirable to incorporate a minor amount of boron fluoride with the liquid hydrogen fluoride as disclosed in the copending application of Frey, Serial No. 467,954, now abandoned.

Methods of effecting the desired alkylation reaction will not be described here in detail inasmuch as they form no part of the present invention and are known to the art. Such methods are disclosed, for example, in U. S. Patent 2,322,800 of Frederick E. Frey, Frey's application Serial No. 424,204, now Patent 2,455,003, granted November 20, 1948, and the aforesaid application of Frey, Serial No. 467,954. While an alkylation reaction is disclosed specifically in describing the invention, it is to be understood that reactions other than alkylation may be carried out in reactor 10, such as isomerization and cyclization. For example, the isomerization of saturated hydrocarbons in the presence of hydrogen fluoride as a catalyst may be carried out in reactor 10. Furthermore, a combination of HF-catalyzed alkylation and isomerization reactions may be effected in reactor 10 in one or more stages. It will be appreciated that my invention may be applied to effluents from any of such processes or others known to the art involving the conversion or treatment of hydrocarbon materials in which an effluent stream containing hydrogen fluoride and low-boiling hydrocarbons is obtained. The apparatus comprising reactor 10 may accordingly be varied to suit the particular process and will comprise one or more reaction zones and may in addition comprise much auxiliary apparatus which need not be shown or discussed here in detail.

Considering the case in which isobutane is alkylated with butylenes in reactor 10, liquid concentrated hydrofluoric acid and liquid hydrocarbon reactants under pressure, are agitated together to produce a temporary emulsion of hydrocarbon and acid phases and give ready access of isobutane to the acid phase, wherein most of the reaction takes place. The emulsion is vigorously circulated to distribute the olefin reactant in low concentration and thus discourage polymerization and permit a maximum of alkylation. A several-fold molar excess, at least, of isobutane over olefin is maintained to minimize realkylation of primary alkylate. Normal paraffins act as diluents and impede access of isobutane to the catalyst and are preferably kept at low concentration. Actually, due to the impracticability of preparing absolutely pure feed stocks and possibly due also to side reactions, some normal butane and some propane are ordinarily present, along with traces of lighter gases. A reaction temperature of 75 to 115° F. gives good results and can be maintained by water cooling to take up exothermic heat of reaction; refrigeration is not necessary. Reaction time is less than one hour, and ordinarily 10 to 15 minutes is adequate. With continued use the acid acquires acid-soluble organic contaminants which are removed by distillation; the titratable acidity of the catalyst phase is usually maintained at 85 to 90 per cent.

Effluents from the reactor zone 10 contain unconverted low-boiling hydrocarbons including propane and a large excess of isobutane, together with higher-boiling paraffinic hydrocarbons produced by alkylation reaction and hydrogen fluoride catalyst. Such effluents are continuously withdrawn via line 24 and passed to settling tank 18, wherein a phase separation is readily obtained. In case the conversion carried out in reactor 10 is at a temperature above that allowing separation of the effluents into the liquid phases, suitable cooling means (not shown) may be provided in line 24 to effect the desired condensation and bring the mixture to the preferred temperature range for liquid phase separation, such as the range of 75 to 115° F. just mentioned. An acid-rich phase is withdrawn from settler 18 via line 20, as heretofore mentioned, and returned by pump 21 to the reactor. A portion of this acid phase is usually withdrawn via line 26 and passed to purification means not shown, after which it is reintroduced along with make-up acid through line 16. From settling tank 18 the upper hydrocarbon-rich phase, which contains small amounts of hydrogen fluoride dissolved therein, is passed via line 30 into surge tank 32. Small amounts of undissolved acid may drop out in tank 32 and be recovered through line 34. Pop-off lines 29 and 31 are provided at the tops of tanks 18 and 32, respectively, for release of small amounts of light gases which may accumulate therein. Vent gases from lines 29 and 31 may be passed through an absorber to remove any hydrogen fluoride contained therein as well as valuable hydrocarbons. A conventional method for removing any hydrogen fluoride from the vent gases comprises contacting the gases in the absorber with an olefinic absorption liquid and the subsequent separation and recovery of hydrogen fluoride from the absorption liquid. The operation may be performed by a short absorption column 33 built directly on top of surge tank 32, with direct communication between the two, so that gases pass up from the upper portion of tank 32 into absorber 33, and absorption liquid flows down from absorber 33 into the liquid in surge tank 32. A liquid, olefin-containing stream is introduced to the top of absorber 33 through line 35; this may be a portion of the same olefin stream which is introduced through line 14, or may be heavier olefins which will also react with isobutane to produce a suitable alkylate. The olefins react with free HF to form corresponding alkyl fluorides, and a resulting liquid mixture of hydrocarbons and alkyl fluoride flows down through absorber 33 into tank 32. Vapors of light hydrocarbons, such as propane and lighter, free from hydrogen fluoride, pass out through line 37. This is more fully disclosed and discussed in Leonard and Hettick Patent 2,425,745, granted August 19, 1947. In a typical operation the tanks 18 and 32 are held under about 100 and about 95 pounds gage pressure, respectively. The liquid hydrocarbon phase containing dissolved hydrogen fluoride is withdrawn through line 36 by means of pump 38 and passed via line 40 and/or line 41 and/or line 43 into fractionator 42, but is preferably introduced upon the top tray of the fractionator. This liquid feed is ordinarily obtained from surge tank 32 at substantially atmospheric temperature, or only slightly above such as 75 to 115–125° F. and need not be further cooled before being introduced into tower 42. In fact, in order to increase the capacity of the fractionator, the feed stream may be heated somewhat by heater 39.

In azeotrope tower 42 a continuous fractionation is carried out whereby all of the dissolved hydrogen fluoride is stripped from the feed and withdrawn in the overhead product via line 44 usually along with at least sufficient propane, isobutane, and/or other light hydrocarbons to form an azeotropic mixture therewith. Propane and lighter gases may comprise a substantial proportion of the light hydrocarbon material taken off in line 44, the remainder being isobutane and heavier, including only a very small amount of vaporized alkylate. The uncondensed low-boiling fraction in line 44 may be passed to settling tank 18, or through line 45 to surge tank 32, or both. The overhead vapor in line 44 may be passed, into, or bubbled through, the liquid in either tank 18 or tank 32, but preferably tank 18, and is substantially all condensed except for non-condensible vapors which are vented through lines 29 or 31, or through absorber 33. If desired, any part or all of the uncondensed overhead vapor from fractional distillation tower 42 may be passed directly into reactor 10 through lines 44 and 46 or, alternatively, through lines 47, 48, and/or 49, into one or more of lines 16, 14, and/or 12, respectively. In either case, this uncondensed vaporous mixture is introduced into and rapidly mixed with a large amount of liquid, and is condensed by and/or absorbed by said liquid, and is again eventually passed to settling tank 18. When passed into a large body of liquid, as in tank 18 or tank 32, the vapor should be passed into the bottom of the liquid so that any bubbles which are formed have an adequate chance to be absorbed, or have condensable material absorbed therefrom. As previously mentioned, the temperature of this vaporous mixture will not be much higher than the temperature of the liquid to which it is added.

From the bottom of fractionator 42 a liquid stream is passed by means of pump 50 through line 52 into reboiler means 54, wherein sufficient heat is imparted by a heat source, such as fire or steam, to carry out the fractionation in tower 42. This reboiler is preferably an externally heated unit as shown, but may comprise heating coils placed within the bottom of tower 42 in known manner. In the arrangement shown heated liquid is returned to the lower portion of the fractionator through the line 56. A kettle product essentially free from hydrogen fluoride is withdrawn through line 58. This product comprises the normally liquid alkylate as well as inert hydrocarbons and excess isobutane, and corresponds essentially to the hydrocarbon content of the reactor effluents except for that dissolved in the acid phase in settler 18. The hydrogen fluoride-free kettle product is passed to further fractionation means (not shown) for the recovery and recycle of isobutane through line 12, and recovery of the desired alkylate. Ordinarily this kettle product is subjected to a conventional defluorination treatment prior to such fractionation.

As an example of the actual operation of an alkylation plant in accordance with my invention, the following data are presented. It will be appreciated that these data are merely illustrative and are not to be construed as unduly limiting the invention. A combined hydrocarbon feed including fresh reactants plus recycled isobutane is passed into the reactors at 95° F. at a rate of 960 barrels per hour. The temperature of this feed may upon occasion vary from about 85 to about 110° F., and the quantity may range from 800 to 1000 barrels per hour, depending upon availability of feed stocks. Recycle, regenerated, and makeup acid enters at similar temperatures and similar rates (about 1040 barrels per hour), so that about a 1:1 volume ratio of hydrocarbon to acid is used. When the conventional condenser and accumulator is used on the overhead from the azeotrope tower and the resulting condensate is recycled, such as to settler 18, the temperature of the contents of the settler 18 is about 95° F. and the pressure is about 115 pounds per square inch gage (100 to 120 range). About 1040 barrels per hour of acid are separated in settler 18 and recycled to the reactor. About 1160 barrels per hour of hydrocarbon material are passed from settler 18 to surge tank 32 and, after removal of a small quantity of acid from the hydrocarbon material therein, the hydrocarbon stream is passed through line 36 and heater 39, wherein it is raised to a temperature of about 140 to about 155° F., in this case about 148° F., at which temperature it enters the top tray of azeotrope tower 42. This hydrocarbon stream may vary from about 1000 to about 1200 barrels per hour with the previously mentioned range of feed rates. Column 42 is a 7 foot diameter, 20 plate fractionator, and is operated with a kettle temperature of about 190° F. (180 to 200° F. ordinary range) at about 175 pounds per square inch gage pressure (ranging from 170 to 190 pounds), and an overhead vapor temperature of about 148° F. (145 to 155° F. range). The overhead vapors upon a liquid basis amount to about 150 to 200 barrels per hour of which 2 to about 15 barrels per hour is hydrogen fluoride. In the specific operation hereindescribed, about 200 barrels per hour overhead is produced of which about 4 barrels is hydrogen fluoride. The kettle product of about 1000 barrels per hour is substantially free from hydrogen fluoride. When the same operation is conducted without the use of the conventional condenser and accumulator on the overhead from the azeotrope tower, the overhead fraction from the azeotrope tower is passed directly into settler 18 and bubbles through the liquid container therein. Under such conditions of operation the temperature of the contents of the acid settler are from about 100 to about 105° F. an increase of only about 5 to 10° over that operation when a condenser and accumulator is used. In other respects the operation is substantially unchanged.

It is interesting to note that the above operation represents an appreciable overload on the column in comparison with design and ordinarily used throughput rates. However, the practice of the present invention is an important factor in enabling the column to handle this load and still produce a hydrogen fluoride-free kettle product.

In a variant of the procedure just described, the overhead vapors from tower 42 are passed through lines 44 and 47 into the liquid, recycled hydrofluoric acid flowing through lines 22 and 16 into reactor 10. With other conditions the same as just discussed, and with the same amount of cooling water supplied to heat-exchangers in reactor 10, the temperature of the reaction mixture in reactor 10 is 2 to 7° higher, and the temperature of the contents of the acid settler 18 are, again, from about 100 to 105° F.

It will be appreciated, by those skilled in the art, that various modifications of my invention may be practiced, in the light of the foregoing teachings and disclosure, without departing from the spirit of the disclosure or from the scope of the claims.

I claim:

1. In a process for separating a hydrocarbon fraction substantially free from hydrogen fluoride from a mixture containing low-boiling paraffin hydrocarbons and hydrogen fluoride, which comprises subjecting such a mixture to conditions forming a liquid hydrogen fluoride-rich phase and a liquid hydrocarbon-rich phase in a separating zone, withdrawing said liquid hydrogen fluoride-rich phase, passing said liquid hydrocarbon-rich phase containing dissolved hydrogen fluoride into a fractional distillation zone, and separating from said fractional distillation zone a vaporous low-boiling fraction containing a low-boiling paraffin hydrocarbon and hydrogen fluoride, the improvement which comprises passing said vaporous fraction directly from said distillation zone into said liquid hydrocarbon-rich phase without intermediate condensation of the vaporous fraction in such a manner that vapors bubble into the liquid and condense therein, and separating also from said fractional distillation zone a liquid higher-boiling hydrocarbon fraction substantially free from hydrogen fluoride.

2. In a process for separating a hydrocarbon fraction substantially free from hydrogen fluoride from a mixture containing low-boiling paraffin hydrocarbons and hydrogen fluoride, which comprises subjecting such a mixture to conditions forming a liquid hydrogen fluoride-rich phase and a liquid hydrocarbon-rich phase in a separating zone, withdrawing said liquid hydrogen fluoride-rich phase, passing said liquid hydrocarbon-rich phase containing dissolved hydrogen fluoride into a fractional distillation zone, and separating from said fractional distillation zone a vaporous low-boiling fraction containing a low-boiling paraffin hydrocarbon and hydrogen fluoride, the improvement which comprises passing said vaporous fraction directly from said distillation zone to said separating zone without intermediate condensation of the vaporous fraction in such a manner that vapors bubble into the liquid in said separating zone and condense therein, and separating also from said fractional distillation zone a liquid higher-boiling hydrocarbon fraction substantially free from hydrogen fluoride.

3. In a process for reacting paraffin hydrocarbons in the presence of hydrogen fluoride, the improvement which comprises passing an effluent directly from a reaction zone, in which a low-boiling paraffin is reacted in the presence of a catalyst comprising hydrogen fluoride, to a separating zone under conditions such that a liquid hydrogen fluoride-rich phase separates from a liquid hydrocarbon-rich phase, returning at least a portion of said liquid hydrogen fluoride-rich phase back to said reaction zone, passing said liquid hydrocarbon-rich phase containing dissolved hydrogen fluoride to a high point in a fractional distillation zone as feed therefor, stripping from said feed in said fractional distillation zone a vaporous low-boiling fraction containing hydrogen fluoride and a low-boiling paraffin, passing said vaporous low-boiling fraction directly from said fractional distillation zone into the liquid in said separating zone without intermediate condensation thereof, and recovering a liquid high-boiling fraction from said distillation zone substantially free from hydrogen fluoride.

4. In a process for the alkylation of isobutane with a low-boiling olefin in the presence of hydrogen fluoride as the catalyst comprising passing an effluent from said alkylation to a separation zone in which a liquid hydrogen fluoride-rich phase and a liquid hydrocarbon-rich phase are formed, recycling at least a portion of said hydrogen fluoride-rich phase to said alkylation as the catalyst therefor and passing said hydrocarbon-rich phase containing dissolved hydrogen fluoride to a fractional distillation zone in which a vaporous overhead fraction containing hydrogen fluoride and isobutane in about the azeotropic ratio and a liquid bottom fraction substantially free from hydrogen fluoride are recovered, the improvement which comprises passing said vaporous overhead fraction from said fractional distillation zone directly into the liquid in said separation zone without intermediate condensation of said vaporous overhead fraction under conditions such that at least a major portion of said vaporous overhead fraction is cooled, condensed and separated into a hydrogen fluoride-rich phase and a hydrocarbon-rich phase.

5. In a process for reacting a low-boiling paraffin hydrocarbon in the presence of a catalyst comprising hydrogen fluoride and subsequently distilling in a distillation zone a mixture of hydrogen fluoride and low-boiling paraffin hydrocarbons from a liquid hydrocarbon mixture containing dissolved hydrogen fluoride charged to said distillation zone from said reaction, the improvement which comprises separating directly from said fractional distillation zone a vaporous low-boiling fraction containing a low-boiling paraffin hydrocarbon and hydrogen fluoride, passing said vaporous fraction without intermediate condensation thereof directly into a liquid hydrocarbon-hydrogen fluoride mixture, and passing a hydrocarbon stream from said hydrocarbon-hydrogen fluoride mixture to said distillation zone as said charged mixture.

6. In a process for the alkylation in liquid phase of isobutane with a low-boiling olefin in the presence of liquid hydrogen fluoride as the catalyst, comprising passing a liquid effluent mixture from said alkylation to a separation zone and therein separating a liquid hydrogen fluoride-rich phase and a liquid hydrocarbon-rich phase, and passing said liquid hydrocarbon-rich phase containing dissolved hydrogen fluoride to a fractional distillation zone in which a vaporous overhead fraction containing hydrogen fluoride and isobutane is separated from a liquid bottom fraction which is substantially free from hydrogen fluoride, the improvement which comprises passing said vaporous overhead fraction from said fractional distillation zone directly, and without intermediate condensation thereof, into a liquid in said process ahead of said fractional distillation zone under conditions such that components of said vaporous fraction are absorbed in said liquid.

7. In a process for the alkylation in liquid phase in an alkylation zone of isobutane with a low-boiling olefin in the presence of liquid hydrogen fluoride as the catalyst, comprising passing a liquid effluent mixture from said alkylation zone to a separation zone and therein separating a liquid hydrogen fluoride-rich phase and a liquid hydrocarbon-rich phase, passing said liquid hydrocarbon-rich phase containing dissolved hydrogen fluoride to a fractional distillation zone, and fractionally distilling said material into a vaporous overhead fraction containing all of the hydrogen fluoride in a material charged to said zone and a liquid bottom fraction free from hydrogen fluoride, the improvement which comprises passing said vaporous overhead fraction from said fractional distillation zone without intermediate condensation thereof into admixture with liquid material in said alkylation zone.

8. The improved process of claim 7, in which said uncondensed vaporous fraction is passed into admixture with a liquid stream which is passing directly into said reaction zone.

9. In a process for reacting paraffin hydrocarbons in a reaction zone in the liquid phase in the presence of a liquid hydrogen fluoride catalyst, which comprises passing a liquid effluent mixture from said reaction zone to a separation zone and separating a liquid hydrogen fluoride-rich phase and a liquid hydrocarbon-rich phase containing dissolved hydrogen fluoride, passing said liquid hydrocarbon-rich phase containing dissolved hydrogen fluoride to a fractional distillation zone and stripping from said feed in said fractional distillation zone a vaporous low-boiling fraction containing said dissolved hydrogen fluoride and a low-boiling paraffin from a high-boiling liquid hydrocarbon material which is free from hydrogen fluoride, the improvement which comprises passing said vaporous low-boiling fraction directly from said fractional distillation zone without intermediate condensation thereof into liquid contained in said reaction zone.

JOHN V. JOLLY.

REFERENCES CITED

The following references are of record in the file of this patent:

UNITED STATES PATENTS

| Number | Name | Date |
|---|---|---|
| 2,397,085 | Boedeker et al. | Mar. 26, 1946 |
| 2,413,868 | Frey | Jan. 7, 1947 |
| 2,414,626 | Allen | Jan. 21, 1947 |
| 2,440,454 | Vinyard | Apr. 27, 1948 |